United States Patent [19]

O'Cheskey

[11] 4,332,680
[45] Jun. 1, 1982

[54] FILTER SLUICING APPARATUS

[75] Inventor: Theodore H. O'Cheskey, Whittier, Calif.

[73] Assignee: United States Filter Fluid Systems Corporation, Whittier, Calif.

[21] Appl. No.: 140,298

[22] Filed: Apr. 14, 1980

[51] Int. Cl.³ .......................................... B01D 33/26
[52] U.S. Cl. ................................. 210/143; 210/327; 210/331; 210/332; 210/345
[58] Field of Search ............... 210/791, 91, 106, 107, 210/143, 297, 314, 327, 331, 332, 334, 391, 408, 409, 413, 415, 345

[56] References Cited

U.S. PATENT DOCUMENTS

| | | | |
|---|---|---|---|
| 2,447,520 | 8/1948 | McGill et al. | 210/91 |
| 2,592,972 | 4/1952 | Strassheim | 210/107 |
| 3,285,417 | 11/1966 | Schmidt et al. | 210/777 |
| 3,397,783 | 8/1968 | Pearce | 210/332 |
| 3,643,806 | 2/1972 | O'Cheskey | 210/327 |
| 3,680,702 | 8/1972 | Weinstein | 210/334 |
| 3,754,659 | 8/1973 | Krynski et al. | 210/334 |
| 4,230,576 | 10/1980 | Müller | 210/107 |
| 4,276,166 | 6/1981 | Müller et al. | 210/327 |

*Primary Examiner*—Peter A. Hruskoci
*Attorney, Agent, or Firm*—Christie, Parker & Hale

[57] ABSTRACT

Filtering apparatus includes a shell with at least one filter leaf mounted in the shell to be rotatable about an axis. Means are provided for forcing a solid-containing liquid into the shell and into the leaf to form a cake of solids on the leaf. Means are also provided for removing filtered liquid from the leaf and the shell. A nozzle in the shell is disposed adjacent the leaf to direct a jet of sluicing liquid against the leaf as the leaf rotates. A sluicing liquid is supplied to the nozzle to wash solids from the leaf, and means are provided for moving the nozzle toward and away from the axis of leaf rotation in a plane substantially parallel to the leaf to remove solids from the leaf.

12 Claims, 5 Drawing Figures

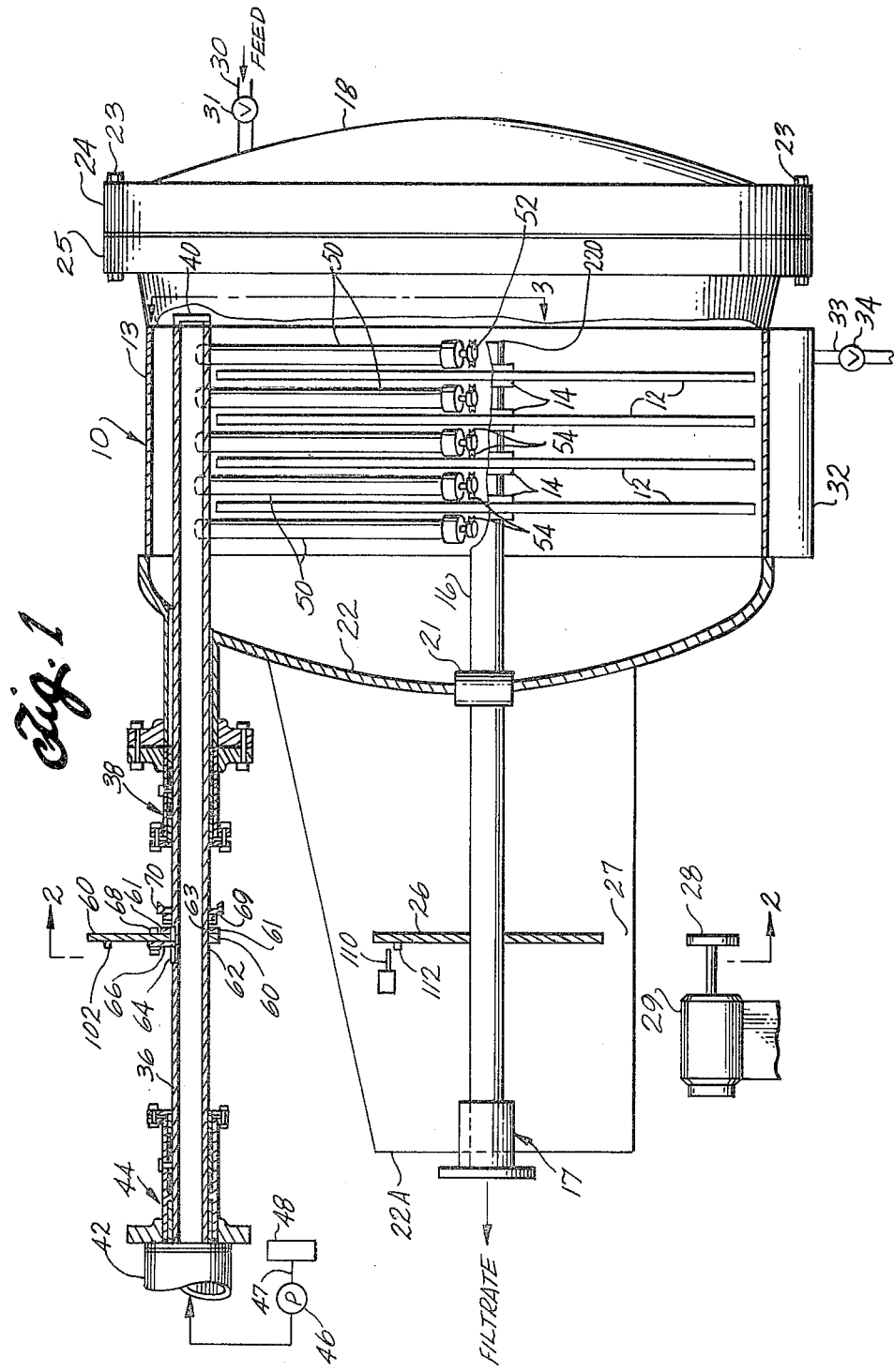

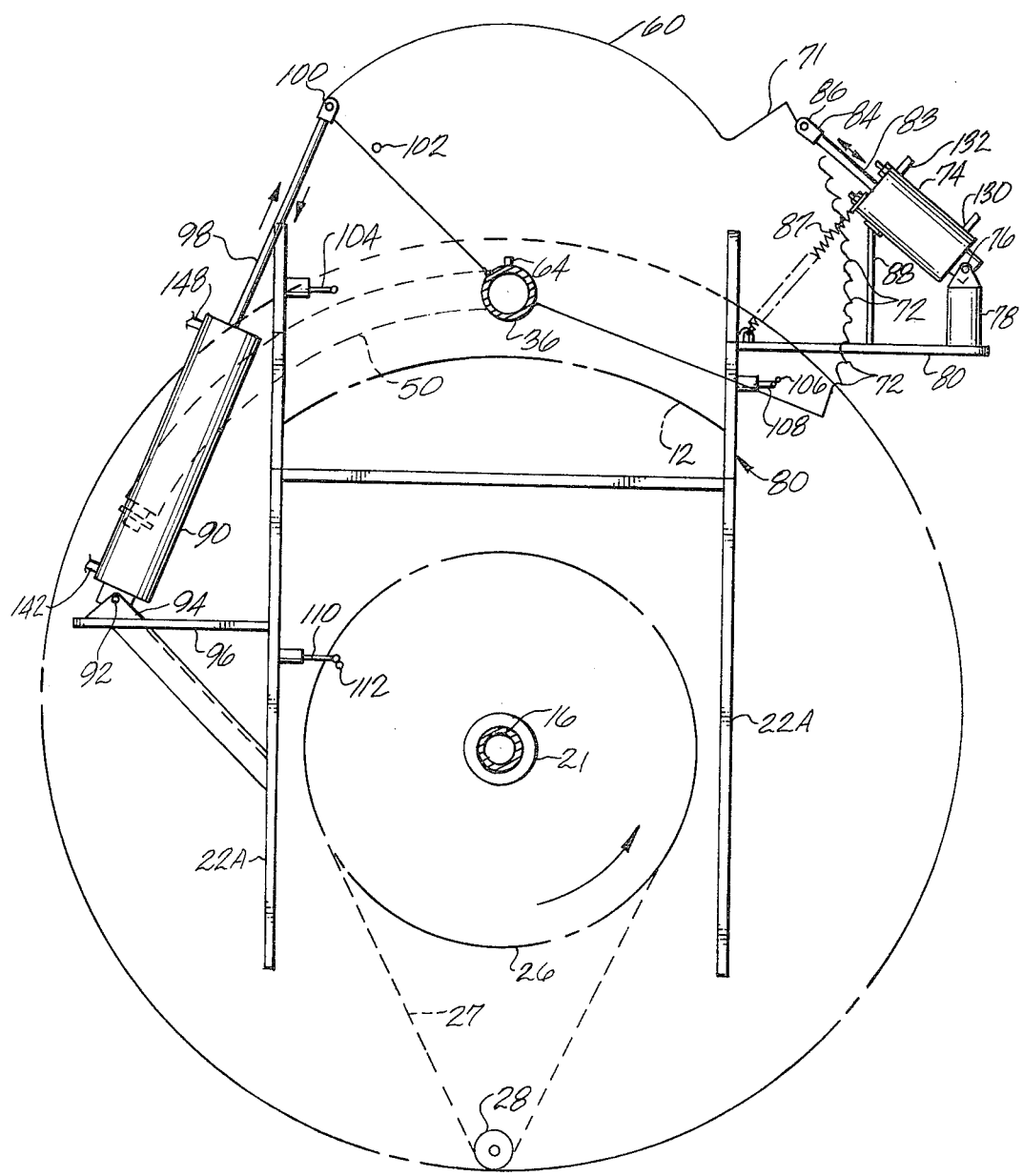

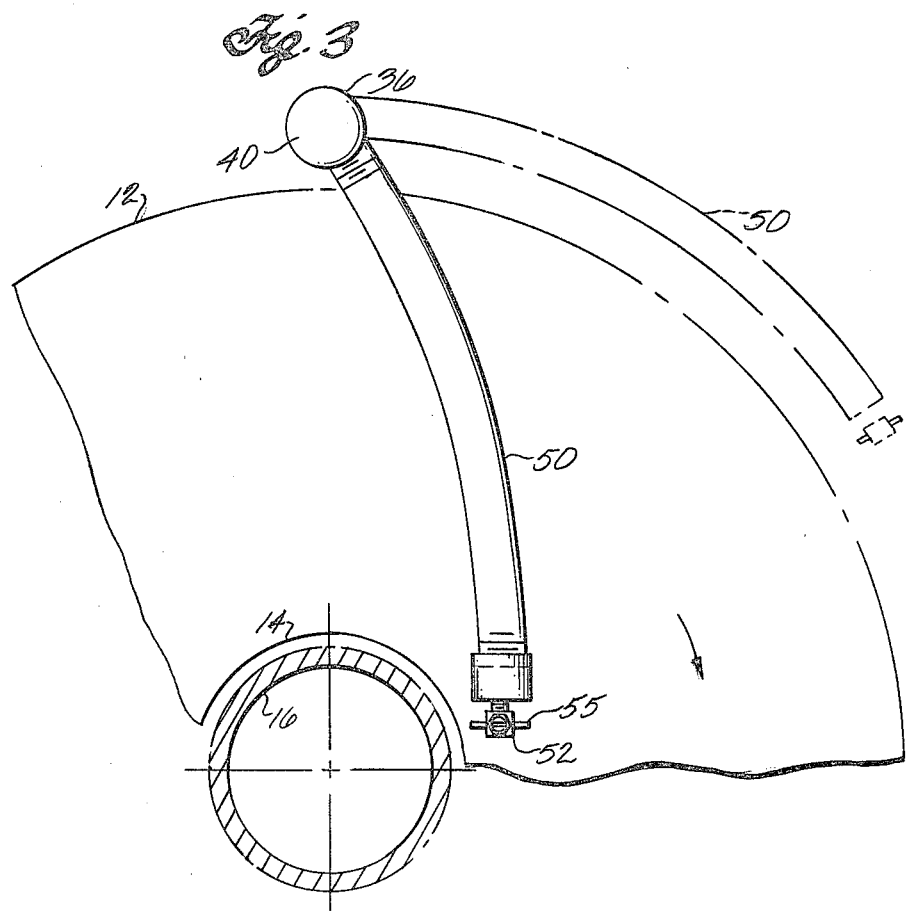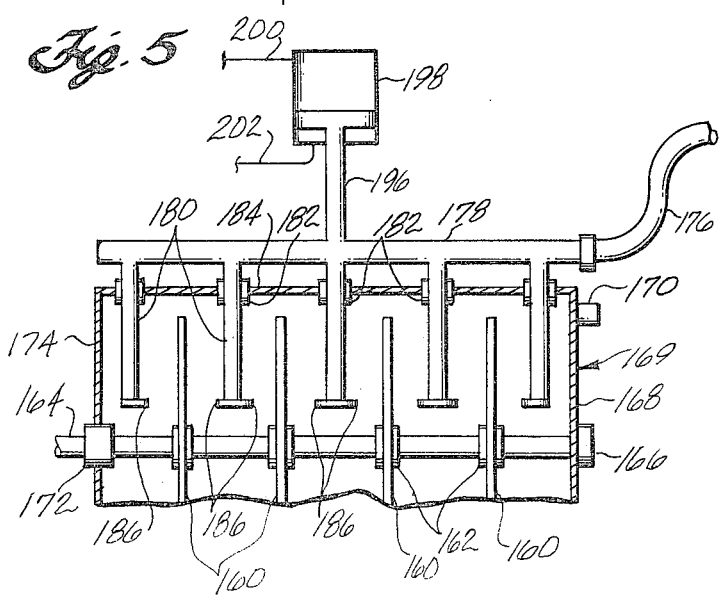

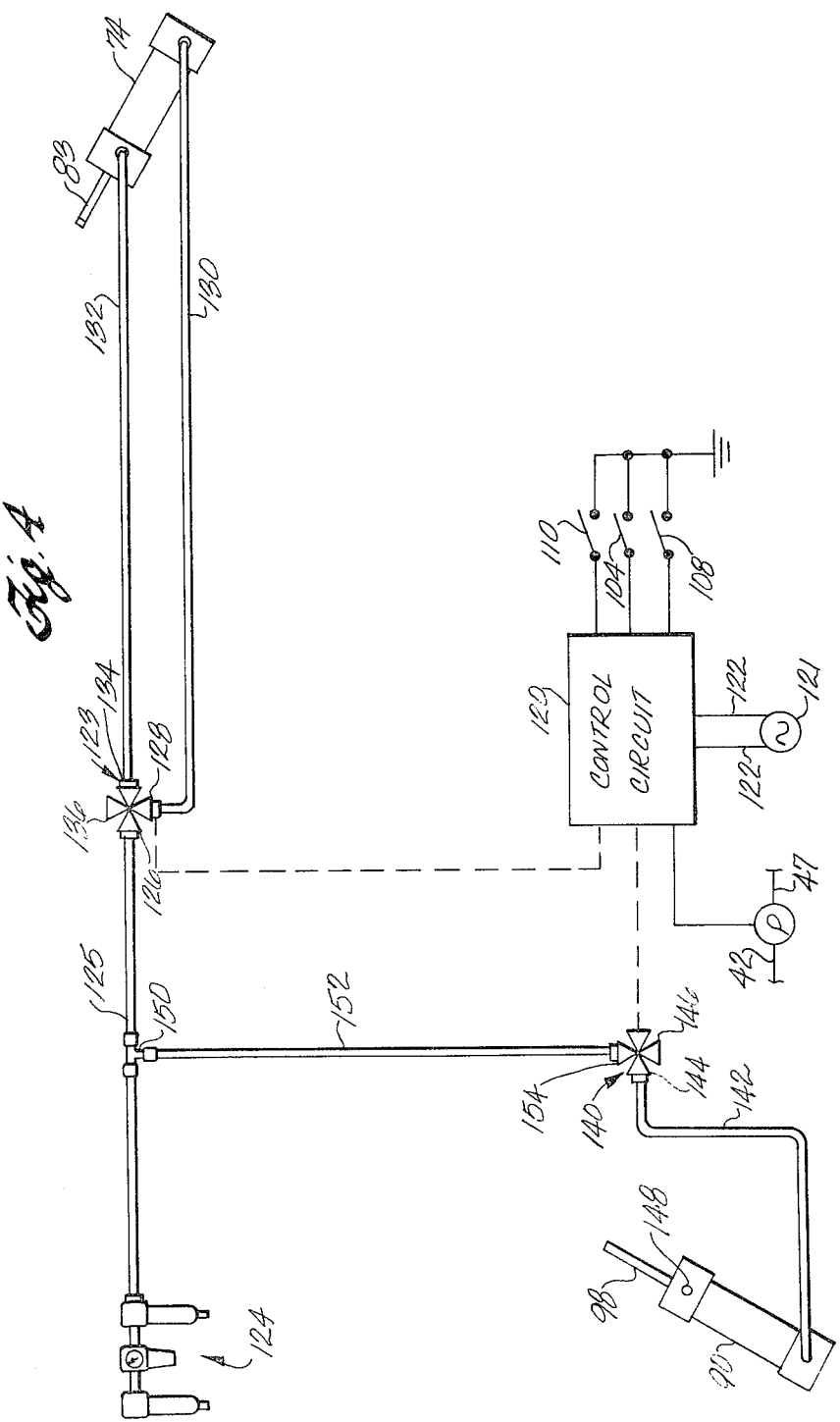

FILTER SLUICING APPARATUS

BACKGROUND OF THE INVENTION

This invention relates to an improvement in rotary pressure leaf filters, and more particularly to apparatus for removing the filter cake which accumulates on the outer surfaces of filter leaves during the filtration process.

Although the apparatus of this invention is useful in separating many different types of solids suspended in various liquids, it is ideally suited for removing ash and mineral residue solids from liquid produced during the solvent refining of coal.

It has been known for many years that both liquid and solid solvent-refined coal can be made from a wide range of high-sulfur coals. In a typical process for making solvent-refined coal, raw coal is crushed and mixed with a creosote-like solvent. The mixture is pressurized, and hydrogen gas is added. The mixture is heated to convert most of the carbon and hydrocarbons in the coal to liquid form at the temperature and pressure of the process. Insoluble impurities, such as mineral residue and ash-forming impurities, remain suspended in solid form.

The industry has long sought an economical way to separate the solid impurities from the liquefied coal. For example, experts in the industry thought that it would not be practical to effect the separation in a filter which uses vertical filter leaves mounted to rotate about a horizontal axis, because it was believed that the filter cake would dislodge too easily from the filter leaf (septum) with slight pressure fluctuations across the filter medium inherent in most filtering operations. Consequently, the industry tried to use horizontal leaf filters, but they proved to be impractical, because the overhead motor and drive assembly interferes with the filter screen maintenance and inspection, and because they require inordinate overhead clearance for assembly and disassembly. Moreover, the horizontal screens crease and tear in coal liquefaction service. Another objection is that the horizontal leaves require precoating with a filter aid, such as diatomaceous earth or the like. The horizontal screens also become quickly blinded with the fine solids, because there is no effective method of cleaning them. For example, the horizontal leaves are rotated at high rpm to create centrifugal force to sling cake off leaves, but this has been unsatisfactory. Accordingly, the filter cycle of the horizontal leaf-type filter is relatively short, requiring frequent shutdown for clean-up and precoating of the filter leaves.

Rotary drum-type filters were also considered, but they required an unacceptable amount of filter aid medium.

Some prior art rotary pressure leaf filters have used fixed nozzles to direct a jet of sluicing liquid against the cake collected on the surface of the filter leaf. This has proved ineffective in removing filter cake collected during the filtering of solvent-refined coal, especially when no precoating filter aid is used.

U.S. Pat. No. 3,397,783 to Pearce discloses a nozzle mounted to move along an arcuate path in a plane perpendicular to the surface of a filter and direct a jet of sluicing liquid against the filter surface. Such apparatus is inefficient for removing difficult materials, such as the solids remaining in liquefied coal, because the angle of the jet relative to the surface, and the distance of the jet from the surface, changes as the nozzle moves. Thus, the nozzle is at the optimum angle and distance for only a brief portion of the cycle.

The filtering apparatus of this invention permits rapid and efficient filtration of the liquefied coal fraction to separate it from the solids originally present in the processed coal, because this invention makes possible efficient in-place cleaning of filter cake from filter leaves, even when no filter aid is used. The cleaning is accomplished quickly and thoroughly so that the cleaned filter leaf is restored to a condition virtually as good as new after each cleaning operation.

SUMMARY OF THE INVENTION

The filtering apparatus of this invention includes a shell in which at least one rotary pressure filter leaf is mounted to be rotatable about an axis. Means are provided for forcing a solids-containing liquid into the shell and into the leaf to form a filter cake of solids on the leaf. Means are provided for removing filtered liquid from the leaf and the shell. A nozzle in the shell is disposed adjacent the leaf to direct a jet of sluicing liquid against the leaf. Means are provided for rotating the leaf about the axis while supplying sluicing liquid under pressure to the nozzle to wash solids from the leaf, and means are provided for moving the nozzle toward and away from the axis of leaf rotation in a plane substantially parallel to the filter leaf, so that the leaf is cleaned of filter cake solids by the jet, which remains at a substantially constant angle and distance from the leaf during the cleaning.

In the preferred embodiment, the apparatus includes a plurality of vertical leaves and nozzles spaced along a horizontal axis about which the leaves are rotated, and means responsive to leaf rotation move the nozzles with respect to the axis of rotation. Each nozzle is mounted on a separate respective sluicing pipe adjacent a respective face of a filter leaf, and the sluicing pipers move radially with respect to the axis of leaf rotation. In one form, each sluicing pipe makes a sliding seal through the shell wall. Preferably, a single header pipe makes a rotatable seal through the shell wall, and the header pipe carries a plurality of sluicing pipes, each of which carries a nozzle disposed adjacent a respective face of a filter leaf. Each nozzle emits a fan-shaped jet of sluicing liquid in a plane substantially perpendicular to the plane in which the nozzle moves and to the direction of travel of the portion of the leaf impinged by each jet. The header pipe is rotated stepwise by a ratchet plate mounted on it and operated in response to first sensing means which detect the rotation of the filter leaves. A thrust plate on the header pipe prevents it from moving longitudinally in the rotary seal. During the sluicing operation, the nozzles move from the outer periphery of the leaves to a position near the axis of leaf rotation. Second sensing means detect when the nozzles are at the inner position, and retracting means are actuated in response to the sensing means to retract the nozzles automatically to the original position at the outer periphery of the rotary leaves. The leaves are normally circular, and the sluicing pipes are curved concave toward the axis of leaf rotation, so when the nozzles and sluicing pipes are retracted to the outer periphery of the leaves, the pipes are clear of the leaves to permit them to be moved longitudinally along their axis of rotation for removal from, or insertion in, the shell when the filter is assembled or serviced.

BRIEF DESCRIPTION OF THE DRAWINGS

FIG. 1 is a side elevation, partly broken away, of the presently preferred filtering apparatus of this invention;

FIG. 2 is a view taken on line 2—2 of FIG. 1;

FIG. 3 is an enlarged view taken in the area of 3—3 of FIG. 1;

FIG. 4 is a schematic drawing of a pneumatic system and control circuit for operating the apparatus of this invention; and FIG. 5 is a schematic drawing of an alternate embodiment of the invention.

DESCRIPTION OF THE PREFERRED EMBODIMENT

Referring to FIG. 1, a rotary pressure leaf filter 10 includes four circular pressure filter leaves 12 in a generally cylindrical and horizontal shell 13 closed at one end by a removable door 18. Each leaf is secured by a respective hub 14 mounted on an elongated, hollow, horizontal rotatable shaft 16 journaled through outer and inner rotatable bearings and seals 17 and 21, respectively. The inner bearing and seal 21 is supported by an end wall 22 of the shell. The outer bearing and seal 17 is supported by a cross-member (not shown) on outwardly extending gussets 22A secured at their inner ends to the end wall of the shell. The inner end of the shaft is sealed by a cap 220. Bolts 23, extending through a flange 24 on the door 18, and a matching flange 25 on the shell, secure the door to the shell.

A driven sprocket 26 on the rotatable shaft receives power from a chain 27 disposed around a driving sprocket 28 turned by a variable speed motor 29, when required, as described below.

Liquid to be filtered enters the shell through an inlet 30 and control valve 31 at sufficient pressure to force the liquid through the filter leaves, and out the left (as viewed in FIG. 1) end of the hollow rotatable shaft. The filter 10 also includes a conventional elongated and longitudinally extending trough 32 along its bottom portion, and a drain line 33 and drain valve 34 for draining the shell and removing cake, when required. The construction and operation of rotary pressure leaf filters is well known to those skilled in the art, as indicated by U.S. Pat. No. 3,643,806 to O'Cheskey.

An elongated rotatable header pipe 36 extends through a packing gland 38, which may be of conventional construction, in the upper portion of the filter shell. The header pipe is parallel to the rotatable shaft 16, and is closed by a cap 40 on the end in the shell. The outer end of the header pipe is connected to a sluicing liquid supply pipe 42 by a rotary seal packing gland 44, which may be of conventional construction. A pump 46, connected by a pipe 47 to a supply 48 of sluicing liquid, delivers the liquid under high pressure to supply pipe 42 during the sluicing operation.

Five sluicing pipes 50 are each connected at one end into the header pipe 36 at longitudinally-spaced locations within the shell, so that a separate sluicing pipe may be disposed between adjacent filter leaves in the array of four leaves shown in FIG. 1, and so that a separate sluicing pipe may be disposed adjacent the outer surface of each filter leaf at the end of the filter leaf array.

Each sluicing pipe carries a nozzle 52 at its end remote from the header pipe. Each nozzle located between adjacent leaves has a pair of tips 54, each arranged to direct a jet 55 (FIG. 3) of sluicing liquid in opposite directions from the nozzle and in a flat, fan-shaped spray pattern substantially perpendicular to the major plane of the filter leaves and substantially perpendicular to the direction of travel of the portion of the filter leaves impinged by the jets when the leaves are rotated as described below. Each of the nozzles adjacent the outer surfaces of the leaves at the ends of the leaf array has only one tip 54 set to direct a flat, fan-shaped spray of sluicing liquid against the adjacent filter leaf surface in the same orientation described for the other jets.

A ratchet plate 60 and a hub 61 welded to it have collinear bores 62, 63, respectively, which make a close fit around the header pipe 36. A key 64 in matching keyways in the header pipe and the collinear bores through the hub and ratchet plate locks the hub and ratchet plate against rotation with respect to the header pipe. A tab 66 is welded to the key and secured by a bolt 68 to the ratchet plate so the ratchet plate cannot slide relative to the key or the header pipe.

The right (as viewed in FIG. 1) face of the hub is adapted to bear against a thrust washer 69 secured to a frame member 70 to prevent the header pipe from sliding longitudinally to the right (as viewed in FIG. 1) when high-pressure sluicing liquid is supplied to the nozzles as described below.

As shown best in FIG. 2, the ratchet plate is fan-shaped, with an offset arcuate portion 71 on its right side in which are formed a plurality of ratchet teeth 72. An indexing cylinder 74 is secured by a pivot pin 76 at its lower end to an upright bracket 78 on the outer end of a shelf 80 on a frame 82 mounted adjacent the filter. An indexing piston 83, which fits in the indexing cylinder, extends upwardly to the left and carries on its outer end a yoke 84 and a crosspin 86 adapted to fit between adjacent ratchet teeth. The lower end of an elongated tension spring 87 is secured to the platform 80. The spring extends upwardly to the right, and its upper end is secured to the upper end of the indexing cylinder, so that the cylinder is urged to pivot in a counterclockwise direction (as viewed in FIG. 2) about pivot pin 76 against an upright stop 88 on platform 80. Thus, when the piston reciprocates through a relatively short stroke, as described in detail below, the spring keeps the crosspin 86 secured snugly between adjacent ratchet teeth, and the ratchet plate and header pipe 36 rotate stepwise in a counterclockwise direction (as viewed in FIG. 2) so that the sluicing pipes and nozzles (shown only in phantom line in FIG. 2) move from the outer periphery of the shell and filter leaves toward the inner periphery of the leaves. As the piston 83 returns from the extended position shown in FIG. 2 to its retracted position, the spring permits the piston and cylinder to pivot in a clockwise direction so the crosspin can slide down over the adjacent tooth under it and move to the right to be clear of the teeth. The tension spring then pulls the indexing cylinder to the left (as viewed in FIG. 2) to rest against the stop and align the crosspin to fit into the space between the tooth it slid over and the next lower tooth. Repeated reciprocation of the indexing piston rotates the ratchet plate and header pipe to move the sluice pipes and nozzles stepwise from the dotted line position at the outer periphery of the leaves, as shown in FIG. 2, to the solid line position at the inner periphery of the leaves, as shown in FIG. 3, in a plane substantially parallel to the major planes of the leaves.

Referring to FIG. 2, the lower end of a reset cylinder 90 is secured by a pivot pin 92 to a bracket 94 on a horizontal shelf 96 mounted on the frame 82. The reset cylinder extends upwardly to the right (as viewed in FIG. 2), and the outer end of a reset piston 98 disposed in the cylinder is secured by a pivot pin 100 to the left edge of the fan-shaped ratchet plate.

The ratchet plate carries a first pin 102 adapted to engage a first limit switch 104 when the ratchet plate has carried the header shaft and sluice pipes to the end of the sluicing operation, i.e., to where the nozzles are at the inner periphery of the leaves. As described below, actuation of limit switch 104 causes the reset cylinder to be actuated to drive the ratchet plate and header pipe in a counterclockwise direction back to the position shown in FIG. 2. This causes a second pin 106 on the ratchet plate to engage a second limit switch 108, which deactivates the reset cylinder, as described below with respect to FIG. 4.

The indexing cylinder 74 is actuated as a third limit switch 110 is contacted by a third pin 112 mounted on the driven sprocket 26, which turns in a counterclockwise direction (as viewed in FIG. 2) when variable speed motor 29 (FIG. 1) is turned on at the end of a filtering cycle to rotate the leaves past stationary cutoff blades (not shown) in the shell to remove the bulk of the filter cake as described in U.S. Pat. No. 3,643,806 to O'Cheskey.

The operation of the indexing and reset cylinders to carry out the sluicing cycle can be understood by referring to FIGS. 1, 2, and 4. The sluicing pipes are in the phantom line position shown in FIG. 2, rather than in the solid line position shown in FIG. 3, during the filtering portion of the cycle. Feed under pressure enters the filter through inlet line 30 and control valve 31. Filtrate passes through the filter leaves and from the filter through the hollow shaft 16 on which the filter leaves are mounted. Solid particles in the feed are retained on the exterior surfaces of the filter leaves. After the filter cake builds up to the permissible amount, the inlet line 30 is connected to a supply of nitrogen gas (not shown), and the feed in the filter shell is displaced with nitrogen gas under pressure in a manner well known to those skilled in the art. If desired, the filter cake on the leaves is rinsed with a rinsing solution, which is thereafter displaced through the leaves by nitrogen gas under pressure. The filter cake is now ready for removal by rotating the shaft 16 so that the bulk of the filter cake is cut from the filter leaves by knife blades (not shown) in the manner described in U.S. Pat. No. 3,643,806 to O'Cheskey. The filter cake cut from the leaves falls into the trough 32 in the bottom of the filter and is removed by a conventional screw conveyor (not shown). During the first revolution of the driven sprocket, the variable speed motor operates at slow speed, say, that required to turn the leaves at about one r.p.m.

As the driven sprocket 26 completes its initial revolution to cause the filter cake to be cut from the leaves, pin 112 contacts third limit switch 110, which is connected to a control circuit 120 (FIG. 4), supplied electrical power from a source 121 and leads 122. The control circuit may be of conventional design and, since it forms no part of this invention, is not described in detail.

After the driven sprocket completes its first rotation, the sluicing liquid pump 46 is turned on, and the speed of the motor is increased, either manually or automatically, to rotate the leaves at, say, 6 r.p.m. As the driven sprocket 26 rotates, limit switch 110 is intermittently closed and opened by pin 112 (FIG. 2). This causes a 4-way solenoid valve 123 to change from a first condition to a second condition and then back to the first condition. In the first condition, a regulated air supply 124 is connected by a line 125 through a pressure port 126 and an advance port 128 in the solenoid valve to a first control line 130, which admits air pressure to the underside of the piston 83 in the indexing cylinder 74. A second control line 132 from the upper end of the indexing cylinder is connected through a retract port 134 and an exhaust port 136 in the solenoid valve to exhaust pressure from the uppeer end of the cylinder to the atmosphere. Thus, the indexing piston 83 is driven upwardly through a relatively short stroke to the position shown in FIG. 2, so that the crosspin 86 engages a space between adjacent ratchet teeth to rotate the ratchet plate and header pipe so that the outer ends of the sluice pipe move inwardly for a distance slightly less than the width of the fan-shaped jet of sluicing liquid from the nozzles where the jets strike the filter leaves. In one such installation, this distance is about 2 inches. As can be seen best in FIG. 3, each nozzle emits a fan-shaped jet 55 of sluicing liquid with a width substantially greater than its thickness. For example, the jet is about 2" wide and between about 0.01" and about 0.10" thick where it strikes the filter leaf. The distance of each nozzle from the surface it cleans is between about one and about two inches. The major plane of each jet is substantially perpendicular to the plane in which the sluice pipes move (and the major plane of the leaves), and is also perpendicular to the direction of travel of the portion of the filter leaf impinged by the jet. This provides a maximum scouring action, which leaves the entire surface of the filter leaf shiny clean after each complete sluicing operation.

As the control circuit changes the 4-way solenoid-operated valve from the second condition back to the first condition, air pressure is supplied through pressure port 126, retract port 134, and control line 132 to the upper end of the indexing cylinder. Air is exhausted from the lower end of the indexing cylinder through control line 130, advance port 128, and exhaust port 136 of the 4-way solenoid valve. Each time the driven sprocket 26 and the filter leaves make a complete rotation, the 4-way solenoid valve is cycled between the first and second operating condition, so that the nozzles are moved stepwise inwardly in increments slightly less than the width of the jets shown in FIG. 3. Thus, regardless of the position of the nozzles, they are always at substantially the same distance from the filter leaves, and the jets always impinge the leaves in a plane substantially perpendicular to the surface of each filter leaf, so the entire area of each leaf is scoured uniformly and with maximum effectiveness to clean the filter medium thoroughly.

Each time the piston 83 moves the crosspin 86 upwardly to rotate the ratchet plate and header pipe one step in the counterclockwise direction (as viewed in FIG. 2) and the piston 83 is retracted, the crosspin 86 slides downwardly and outwardly over the adjacent lower tooth. The indexing cylinder 74 rotates slightly in a clockwise direction about pivot pin 76 to accommodate this motion. Tension spring 87 then pulls the indexing cylinder back down against stop 88 so that the piston 83 and crosspin 86 are aligned to engage the next lower space between adjacent ratchet teeth when the indexing cylinder is thereafter actuated to rotate the ratchet plate and header pipe again in the counterclockwise direction.

Each time the piston 83 in the indexing cylinder 74 is withdrawn, the yoke 84 and crosspin 86 are moved downwardly to the right (as viewed in FIG. 2) for a distance sufficient to be outside the periphery of the ratchet teeth. Thus, the crosspin and indexing piston 83 will not interfere with the rotation of the ratchet plate and header pipe in a clockwise direction to return it to the position shown in FIG. 2.

After the ratchet plate and header pipe have been rotated sufficiently to bring the nozzles to the position shown in FIG. 3 at the inner periphery of the filter leaves, first limit switch 104 is closed by pin 102 (FIG. 2) on the ratchet plate. The motor 29, which drives driven sprocket 26, is turned off by suitable control means (not shown), and control circuit 120 causes a 3-way solenoid valve 140 (FIG. 4) to move from a first operating condition to a second operating condition, after a suitable time delay introduced by the control circuit to permit the piston 83 and crosspin 86 in the indexing cylinder to be withdrawn clear of the ratchet teeth. In the first operating condition, the lower end of the reset cylinder 90 is connected by a control line 142 and through a control port 144 to an exhaust port 146 in the 3-way solenoid-operated valve. An exhaust line 148 in the upper end of the reset cylinder is always open to atmosphere. When the control circuit changes the 3-way solenoid valve 140 from the first operating condition to the second operating condition, air pressure is connected from a T-joint 150 in supply line 125, through a line 152, through a pressure port 154, and control port 144 to control line 142, which drives the piston upwardly to the right (as viewed in FIG. 2). This rotates the ratchet plate 60 and header pipe 36 clockwise (as viewed in FIG. 2) until second pin 106 on the ratchet plate contacts the second limit switch 108, causing the control circuit to change the 3-way solenoid valve from the second condition back to the first, so that the lower end of the reset cylinder 90 vents to the atmosphere through control line 142, control port 144, and exhaust port 146 in the 3-way solenoid valve. The equipment is now ready for another filtering cycle.

With the ratchet plate 60 and header pipe 36 rotated back to the position shown in FIG. 2, the sluice pipes 50 are in the phantom line position, so they are clear of the outer periphery of the filter leaves, because the pipes are curved concave toward the axis of leaf rotation. When the door 18 is removed from the filter shell, the filter leaves are thus free to be slipped into the shell or out of the shell for assembly or servicing.

An alternate embodiment of the invention is shown in FIG. 5 in which a plurality of filter leaves 160 are secured by hubs 162 to a horizontal rotatable shaft 164 supported at one end in a bearing 166 mounted on a wall 168 of a filter vessel 169 having an inlet 170. The other end of the rotatable shaft 164 is journaled through a rotatable seal 172 in a second end wall 174 of the filter vessel. Sluicing liquid is supplied from a pump (not shown) through a flexible sluicing line 176 secured to a rigid header pipe 178 disposed outside the vessel to extend in a direction parallel to the rotatable shaft 164. A plurality of sluicing pipes 180 are connected to the header pipe 178, and each sluicing pipe makes a sliding seal through a respective packing gland 182 in the cylindrical wall 184 of the filter vessel. The lower or inner end of each sluicing pipe carries one or more nozzles 186 of a type previously described with respect to FIGS. 1-4, to direct high-velocity, fan-shaped jets of sluicing liquid against the surfaces of the filter leaves during the sluicing cycle.

A piston 196, rigidly connected to the header pipe, makes a sliding fit in a cylinder 198, which is supplied gas pressure through control lines 200 and 202 to advance the header pipe toward the filter shell during the sluicing operation, so the nozzles are moved inwardly from the outer periphery of the filter leaves to the inner periphery. The jets from each nozzle are directed as previously described, so that they cover the entire area of the filter leaves during the sluicing operation as the shaft 164 is rotated. The control of the piston 196 may be automated as described above, or the operation may be done manually.

The advantage of the apparatus shown in FIG. 5 is that the flexible supply line 176 eliminates the need for a high-pressure rotatable seal between the supply line for the sluicing liquid and the header pipe. However, the apparatus of FIG. 5 suffers a disadvantage that it requires a sliding seal for each sluicing pipe extending through the wall of the filter vessel. Otherwise, the apparatus of FIG. 5 enjoys all the advantages described above with respect to the apparatus shown in FIGS. 1-4.

I claim:

1. Filtering apparatus comprising:
    at least one filter leaf mounted in the shell to be rotatable in a substantially vertical plane about a substantially horizontal axis;
    means for forcing a solids-containing liquid into the shell and into the leaf to form a cake of solids on the leaf;
    means for removing filtered liquid from the leaf and the shell;
    a movable nozzle in the shell and disposed adjacent the leaf to direct a jet of sluicing liquid against the leaf;
    means for rotating the leaf about the axis;
    means for supplying a sluicing liquid under pressure through the nozzle to wash solids from the leaf; and
    means for moving the nozzle toward and away from the axis of leaf rotation in a plane substantially parallel to the filter leaf to keep the nozzle a substantially constant distance from the leaf as the jet removes solids from the leaf, the jet of sluicing liquid being substantially fan-shaped with the major plane of the fan-shaped jet lying in a plane substantially perpendicular to the plane in which the nozzle moves.

2. Apparatus according to claim 1 in which the nozzle is arranged such that said fan-shaped jet of sluicing liquid is between about 20 and about 200 times wider than it is thick where it impinges the leaf.

3. Apparatus according to claim 1 which includes means responsive to leaf rotation for moving the nozzle.

4. Apparatus according to claim 1 which includes a plurality of leaves mounted at longitudinally spaced locations along the axis in respective vertical planes, a separate sluicing pipe disposed between adjacent leaves and arranged to receive sluicing liquid, and a nozzle mounted on each pipe to direct jets of sluicing liquid in opposite directions and against adjacent leaves, each jet of sluicing liquid being substantially fan-shaped with the major plane of the fan-shaped jet lying in a plane substantially perpendicular to the plane in which the nozzle moves.

5. Apparatus according to claim 4 in which the nozzles are arranged such that the major plane of each fan-shaped jet is substantially perpendicular to the direction of travel of the portion of the leaf impinged by the jet.

6. Apparatus according to claim 4 which includes a header pipe disposed through the shell, means making a sliding seal between the header pipe and shell, the sluicing pipes being connected to receive sluicing liquid from the header pipe.

7. Apparatus according to claim 6 in which the header pipe makes a rotatable seal through the shell, and the sluicing pipes extend laterally from the header pipe, and means for rotating the header pipe about its longitudinal axis to move the nozzles toward and away from the axis of leaf rotation.

8. Apparatus according to claim 7 in which the header is rotated about an axis parallel to the axis of leaf rotation.

9. Apparatus according to claim 7 or 8 which includes a ratchet plate mounted on the header, an indexing piston mounted to engage the ratchet plate and rotate the ratchet plate and header pipe stepwise in one direction to move the nozzles each step a distance less than the width of the jets where they impinge the filter leaves, a return piston connected to the ratchet plate to rotate the ratchet plate and header pipe in the opposite direction, and means for sensing the rotation of the leaves to actuate the indexing piston.

10. Apparatus according to claim 9 which includes thrust bearing means mounted on the header to limit its longitudinal movement with respect to the rotatable seal.

11. Apparatus according to claim 9 which includes means for sensing the movement of the nozzles toward the inner periphery of the leaves to actuate the return piston to retract the nozzles from between the leaves.

12. Apparatus according to claim 7 in which the filter leaves are circular, and each sluicing pipe is curved concave toward the axis of leaf rotation, so that when the sluicing pipes are moved outwardly away from the axis of leaf rotation, the sluicing pipes are clear of the leaves to permit them to be moved longitudinally along the axis of rotation.

* * * * *